Patented Aug. 31, 1954

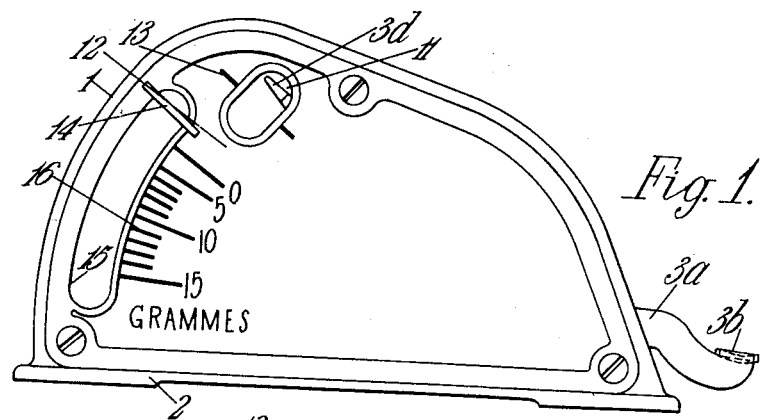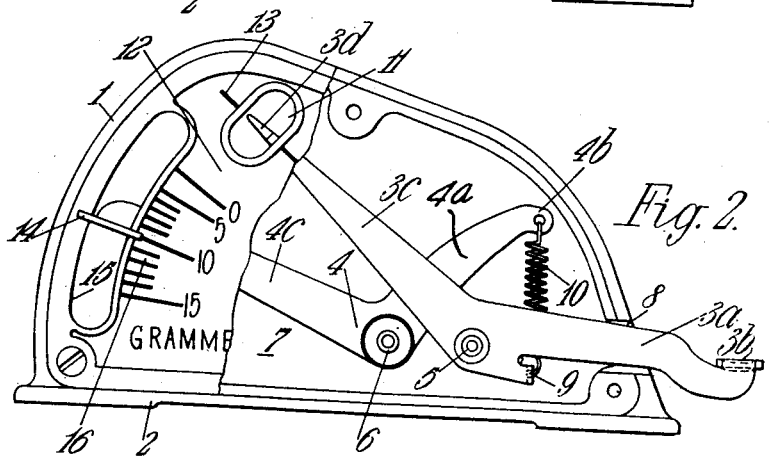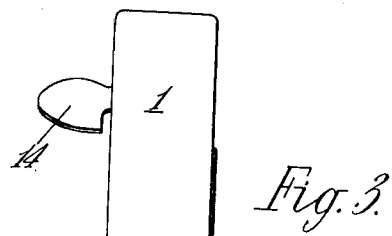

2,687,643

UNITED STATES PATENT OFFICE 2,687,643

TESTING OF THE PRESSURE OF THE STYLUS OF PICKUPS

Edmund Walter Mortimer, Swindon, England, assignor to The Garrard Engineering and Manufacturing Company Limited, Swindon, England Application December 5, 1951, Serial No. 260,058

2 Claims. (Cl. 73—141)

This invention relates to the testing of the pressure of the stylus of a gramophone pick-up.

With present day long playing records the character and pitch of the grooves is such that the loading on the stylus is very critical in that overloading will cause damage to the record while underloading may cause the stylus to ride out of the groove.

The object of the invention is to provide an instrument or device whereby the pressure of the stylus may be checked so that if necessary an adjustment may be made by means of the counterweight or compensating spring that is usually provided on the pick up arm for this purpose.

A further consideration that makes checking necessary is that pick up arms are now being provided with interchangeable heads for playing different types of records, for example 78 R. P. M. coarse pitch records where the stylus may be more heavily loaded and is a shape unsuitable for the grooves of long playing records.

The pressure testing instrument or device according to the invention comprises a spring lever balance system having an element for supporting the stylus on one side of the fulcrum and a manually operable element on the other side of the fulcrum adjustable over a scale to stress the spring and move an indicator to a balanced position.

The lever balance system may comprise a pair of levers mounted on spaced fulcra and having arms on the same side of the fulcra connected by a spring, the lever with the shorter arm being adapted to support the stylus and having a pointer arm in the other lever with the longer arm being provided with a finger piece for manual operation.

In the accompanying drawings:

Figure 1 is a front outside view of the testing device according to the invention.

Figure 2 is an elevation with a part of the front plate of the casing removed to expose the lever balance system.

Figure 3 is an end elevation.

In carrying the invention into effect according to one convenient mode by way of example, a casing 1 is provided having a base 2 adapted to seat on the motor board or turntable of a gramophone.

Within the casing 1 a pair of levers 3, 4 are mounted on spaced horizontal fulcra by the aid of suitable pins 5, 6 supported in a vertical rear wall 7 of the casing.

One lever 3 (referred to as the stylus lever) has an arm 3a projecting forwardly from its fulcrum and extending through an aperture 8 in the casing wall, the outer exposed end of the lever being provided with a horizontal supporting surface 3b on which a stylus is adapted to rest.

Intermediate the ends of this arm 3a and located somewhat forwardly of the fulcrum pin 5 an anchorage 9 is formed for the lower end of a coiled spring 10.

On the other side of the fulcrum the stylus lever 3 is provided with a pointer arm 3c the end 3d of which moves across a window 11 in a removable front wall 12 of the casing 1. Associated with the window 11 is a balance indicating mark 13.

The second lever 4 (referred to as manual lever) is fulcrummed on a horizontal axis parallel to and rearwardly of the fulcrum of the stylus lever 3. Conveniently the distance between the axes of the fulcra pins 5 and 6 is about equal to the distance of the beforementioned anchoring point 9 from the stylus lever fulcrum 5.

The manual lever 4 has an upwardly directed arm 4a bent so that its end 4b lies above said anchoring point 9. To this end 4b the upper end of the coiled spring 10 is anchored.

The manual lever 4 has an arm 4c extending rearwardly from its fulcrum 6 and terminating in a finger piece 14 which extends laterally through a slot 15 in the front wall 12 of the casing. This finger piece 14 is movable over a scale 16 adjacent said slot.

The length of the spring 10 is such that it is unstressed when the levers 3 and 4 are in the free position and its characteristics are such as to be suitable to the range of pressures associated with pick up styluses i. e. up to say 15 grammes.

In using the device it is placed on the motor board or turntable and the pick up stylus placed upon the stylus support 3b. This will cause a free pivoting of the levers 3 and 4 so that the end of the pointer arm 3d is out of register with the zero or balance mark 13.

Pressure is then applied to the finger piece 14 to move the manual lever 4, stressing the spring 10 and causing the stylus lever 3 to pivot until the pointer 3d is in alignment with the balance mark 13.

The pressure of the stylus will then be read from the scale 16 being indicated by the position of the finger piece 14 along the scale.

Adjustment of the loading of the stylus, if necessary, may then be made.

I claim:

1. In a device for testing the pressure of a phonograph pick-up stylus, a lever balance system comprising a first lever, pivotally mounted intermediate its ends about a horizontal axis, a stylus supporting means at one end of said lever, an indicator at the other end of said lever, a balance indicating means adjacent said indicator, a second lever, pivotally mounted intermediate its ends about a horizontal axis parallel to, and horizontally spaced from, said first mentioned axis, one arm of said second lever extending beyond the pivotal axis of said first lever and the end of said last mentioned arm being positioned above the stylus supporting arm of said first lever, a spring connecting said last mentioned end and said stylus supporting arm, the other end of said second lever being manually movable and a load indicating scale cooperating with said manually movable end.

2. In a device for testing the pressure of a phonograph pick-up stylus in accordance with claim 1, wherein the spring extends substantially vertically and exerts an upward force on the stylus supporting arm.

References Cited in the file of this patent

UNITED STATES PATENTS

| Number | Name | Date |
|---|---|---|
| 1,647,287 | Floyd | Nov. 1, 1927 |

FOREIGN PATENTS

| Number | Country | Date |
|---|---|---|
| 506,284 | France | May 26, 1920 |
| 350,590 | Great Britain | June 18, 1931 |